(12) United States Patent
Makwinski et al.

(10) Patent No.: US 9,640,960 B2
(45) Date of Patent: May 2, 2017

(54) CUSTOMIZABLE BUS SYSTEMS

(75) Inventors: Mark Makwinski, Cromwell, CT (US); Phillip Donald Prestigomo, Simsbury, CT (US); Richard R. Picard, West Hartford, CT (US)

(73) Assignee: The Wiremold Company, West Hartford, CT (US)

( * ) Notice: Subject to any disclaimer, the term of this patent is extended or adjusted under 35 U.S.C. 154(b) by 282 days.

(21) Appl. No.: 13/566,116

(22) Filed: Aug. 3, 2012

(65) Prior Publication Data

US 2012/0293921 A1 Nov. 22, 2012

Related U.S. Application Data

(63) Continuation-in-part of application No. 13/081,988, filed on Apr. 7, 2011, now Pat. No. 8,625,255.

(60) Provisional application No. 61/321,665, filed on Apr. 7, 2010.

(51) Int. Cl.
| | |
|---|---|
| *H02B 1/26* | (2006.01) |
| *H02G 3/12* | (2006.01) |
| *H02G 3/06* | (2006.01) |
| *H02G 3/10* | (2006.01) |

(52) U.S. Cl.
CPC ......... *H02G 3/128* (2013.01); *H02G 3/0608* (2013.01); *H02G 3/105* (2013.01)

(58) Field of Classification Search
CPC ....... H02G 3/0608; H02G 3/128; H02G 3/105
USPC .................................................. 361/611, 624
See application file for complete search history.

(56) References Cited

U.S. PATENT DOCUMENTS

| | | | |
|---|---|---|---|
| 4,417,196 A | 11/1983 | Cueto et al. | |
| 4,792,881 A | 12/1988 | Wilson et al. | |
| 5,131,860 A | 7/1992 | Bogiel | |
| 5,203,711 A | 4/1993 | Bogiel | |
| 5,418,328 A * | 5/1995 | Nadeau | 174/494 |
| 5,425,659 A | 6/1995 | Banks | |
| 5,429,518 A * | 7/1995 | Chen | 439/188 |
| 5,687,063 A * | 11/1997 | Chabert | H05K 7/1424 361/726 |
| 6,015,307 A | 1/2000 | Chiu et al. | |
| 6,130,727 A | 10/2000 | Toyozumi | |

(Continued)

FOREIGN PATENT DOCUMENTS

| | | | | |
|---|---|---|---|---|
| EP | 000052025 A1 | 5/1982 | | |
| WO | WO 2008154028 A1 * | 12/2008 | ............ | H01R 19/32 |

*Primary Examiner* — Anatoly Vortman
(74) *Attorney, Agent, or Firm* — McCormick, Paulding & Huber LLP

(57) ABSTRACT

A customizable bus system includes a system module containing one or more accessory modules and is easily mounted along a surface in a workspace, such as the underside of a cabinet. The accessory modules provide conveniently located utility services and applications such as power, lighting or media connections, and may be interchanged within the bus system to provide particular services and applications where they are needed most. Additionally, the bus system may include a control center for controlling the operation of one or more of the accessory modules, such as manually or automatically. The bus system may also include multiple housings that are functionally linked, such as by a connector module having couplings for mechanically linking with housings and providing electrical or other connectivity between the housings.

20 Claims, 11 Drawing Sheets

(56) References Cited

U.S. PATENT DOCUMENTS

| | | | |
|---|---|---|---|
| 6,220,880 B1* | 4/2001 | Lee | H01R 25/003 439/214 |
| 6,492,591 B1* | 12/2002 | Metcalf | 174/53 |
| 6,741,442 B1 | 5/2004 | McNally et al. | |
| 6,811,444 B2 | 11/2004 | Geyer | |
| 6,830,477 B2* | 12/2004 | Vander Vorste et al. | 439/535 |
| 6,940,015 B2 | 9/2005 | Fang | |
| 7,043,543 B2* | 5/2006 | Ewing et al. | 709/223 |
| 7,156,694 B1 | 1/2007 | Anderson | |
| 7,275,947 B2 | 10/2007 | Hartel et al. | |
| 7,324,006 B2 | 1/2008 | Godard | |
| 7,414,329 B2 | 8/2008 | Cleveland et al. | |
| 7,438,566 B2 | 10/2008 | Chen | |
| 7,456,366 B2 | 11/2008 | Makwinski et al. | |
| 7,457,106 B2 | 11/2008 | Ewing et al. | |
| 7,488,204 B2 | 2/2009 | Hsu | |
| 7,535,696 B2 | 5/2009 | Ewing et al. | |
| 7,544,071 B2 | 6/2009 | Jong | |
| 7,544,077 B1 | 6/2009 | Martin et al. | |
| 7,581,977 B1 | 9/2009 | Wu | |
| 7,791,864 B2 | 9/2010 | Matyas et al. | |
| 7,891,993 B2 | 2/2011 | Huber et al. | |
| 7,987,248 B2 | 7/2011 | Ratcliff et al. | |
| 8,033,867 B1* | 10/2011 | Kessler et al. | 439/652 |
| 8,038,454 B2 | 10/2011 | Jiang et al. | |
| 8,039,997 B2 | 10/2011 | Slessman | |
| 8,207,627 B2 | 6/2012 | Aldag et al. | |
| 8,212,395 B2* | 7/2012 | Jansma | 307/38 |
| D666,556 S | 9/2012 | Byrne | |
| 8,264,099 B2* | 9/2012 | Aldag et al. | 307/12 |
| 8,335,574 B2 | 12/2012 | Middlemiss | |
| 8,444,425 B2* | 5/2013 | Byrne | 439/215 |
| 8,450,874 B2 | 5/2013 | Ratcliff et al. | |
| 8,480,420 B2* | 7/2013 | Ziobro | 439/214 |
| 2002/0052940 A1 | 5/2002 | Myers et al. | |
| 2002/0187682 A1 | 12/2002 | Lincoln, III et al. | |
| 2003/0223234 A1 | 12/2003 | Tang | |
| 2004/0160767 A1 | 8/2004 | Mobarak et al. | |
| 2005/0036258 A1 | 2/2005 | Ma et al. | |
| 2006/0044766 A1 | 3/2006 | Hartel et al. | |
| 2006/0254853 A1 | 11/2006 | Van Gieson | |
| 2008/0041623 A1* | 2/2008 | Makwinski et al. | 174/481 |
| 2008/0291607 A1 | 11/2008 | Braunstein et al. | |
| 2009/0289501 A1 | 11/2009 | Garb | |
| 2011/0089768 A1 | 4/2011 | Byrne et al. | |
| 2012/0127637 A1* | 5/2012 | Byrne et al. | 361/627 |
| 2014/0118892 A1* | 5/2014 | Makwinski et al. | 361/675 |

* cited by examiner

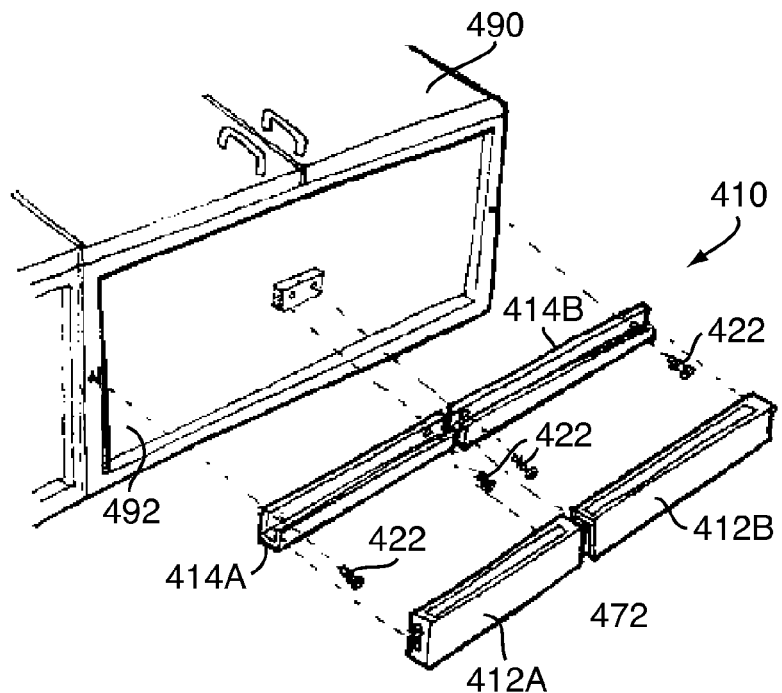
FIG. 6A
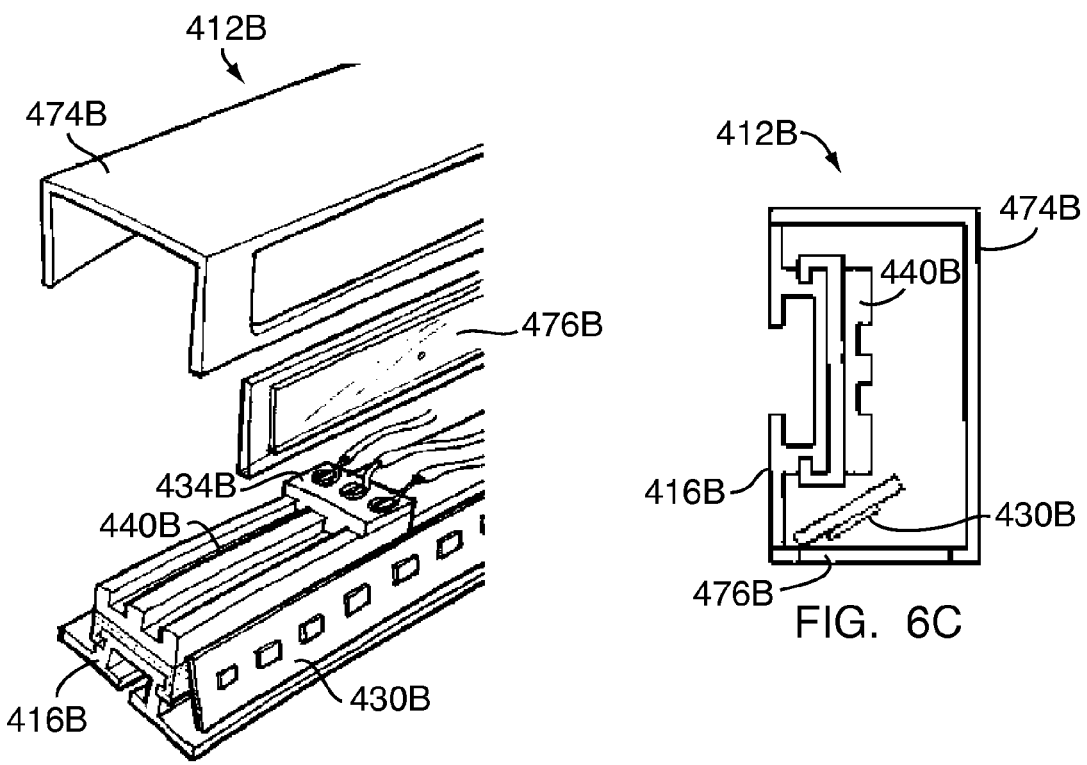
FIG. 6B
FIG. 6C

CUSTOMIZABLE BUS SYSTEMS

CROSS-REFERENCE TO RELATED APPLICATIONS

This application is a continuation-in-part of U.S. patent application Ser. No. 13/081,988, filed Apr. 7, 2011, and claims the benefit of and priority to U.S. Patent Application No. 61/321,665, filed Apr. 7, 2010. Each of these applications is incorporated herein by reference in its entirety.

BACKGROUND

Field of the Invention

The present disclosure relates generally to modular power and utility receptacles. More particularly, the present disclosure relates to systems and methods for providing modular and versatile utility connections and accessories that may be installed in any workspace, and used for a variety of applications.

Description of the Related Art

Typically, homes or offices have specific locations where access to utilities, such as power and lighting, is provided. For example, in the kitchens of homes or restaurants, electrical outlet receptacles are usually located at particular locations on a wall, commonly called a backsplash, near or adjacent to a countertop. Therefore, the locations where electrical appliances such as blenders or toasters may be operated on the countertop are limited based on the locations of electrical outlet receptacles in the vicinity of the countertop.

Similarly, countertops can also provide space for performing work in a kitchen, such as preparing food or cleaning up after a meal. Task lighting is particularly critical to the performance of such tasks and is often installed overhead or beneath a cabinet and above the countertop. Therefore, the locations where such tasks may be performed may also be limited based on the locations of the task lighting in the vicinity of the countertop, which are generally fixed and cannot easily be changed.

In addition to electrical outlet receptacles and task lighting, the availability of other utility services and features, such as audio, video, Ethernet or Internet connections or consoles, is similarly limited based on the locations of service receptacles or portals in workspaces and in the vicinity of working areas, such as countertops.

Accordingly, there is a need for a customizable system for providing utilities and services, such as power, lighting and other applications, where they are needed most.

SUMMARY

The present disclosure is directed to customizable systems and methods for providing utilities and services in convenient locations within workspaces, such as above or near a countertop in a kitchen. The present disclosure may include versatile structures and accessories that enable a user to customize the delivery of utilities and services to locations where they are needed most. Such structures and accessories may be installed within buildings during new construction, and may also be retrofitted into existing spaces.

According to a first aspect of the present disclosure, a customizable bus system includes a system module for supporting accessory modules and a power module for supplying power to the accessory modules. The system module may include a housing, such as a spine assembly, that is formed by a spine base and a spine cover. The spine base may include openings to connect wires and other services to the bus system, along with openings or apertures for mounting the spine bases to a surface, such as the underside of a cabinet or a backsplash or other wall. The spine cover may include openings for receiving and supporting accessory modules, and may be mounted to the spine base to form the spine assembly, for example, by snap-fitting the spine cover to the spine base, using one or more standard fasteners, such as snaps, screws or clips. Accessory modules may be placed into any of the openings in customized configurations defined by a user, and may also be removed from the openings by the user and replaced with other accessory modules or blanks.

The accessory modules are modular units that are interchangeable within various openings of the system module. Each of the accessory modules may include one or more electrical contacts that permit the accessory modules to receive power from the power module. The accessory modules may provide the bus system with accessories having different functionalities, including but not limited to lighting, electrical power receptacles, audio or video connections, Ethernet or Internet connections, Bluetooth® capabilities, docking stations or charging stations. For example, the bus systems of the present disclosure may provide lighting elements in the form of puck lights, arrays of light-emitting diodes (LED), tube lights or light trays. The accessory modules may also provide utility connections in the form of two- or three-prong electrical outlet receptacles, ground fault current interrupter (GFCI) outlet receptacles, category-5 ("CAT-5") cable ports, telephone ports or universal serial bus ("USB") ports. Furthermore, the bus systems may also include accessory modules that contain speakers, monitors, motion sensors, Bluetooth® or MP3 docking stations or other services. Additionally, accessory modules may be interchangeable within the accessory openings, and blanks may be installed into accessory openings within the system modules to cover accessory openings where an accessory is not needed.

The power module may include a power circuit and a power connection. The power circuit may include flexible wires and connective features, such as male or female connectors for interfacing with corresponding female or male connectors of accessory modules, or a rigid electrical conductor having a series of electrical contacts for providing power to one or more accessory modules. The power connection may provide power to a power circuit within the bus system from a power source by standard means, such as a hard-wired connection or a standard plug. The power module may provide alternating current (AC) or direct current (DC) power at one or more voltage levels, and may include one or more power circuits or tracks within the housing for conducting electricity. For example, the power module may include a single power supply that is maintained a constant voltage level, or one or more power supplies, each of which is maintained at a constant voltage level. The power module may also provide both a low voltage power supply, or track, for powering low-voltage applications such as lights, and a high power supply, or track, for powering high-voltage accessories such as electrical outlets or audio speakers. The power module may further include transformers for providing power at one or more additional voltage levels, as necessary. For high-voltage applications, the bus systems may preferably provide power at approximately 120 volts (V). For low-voltage applications, the bus system may preferably provide power at approximately 24 volts (V).

The bus systems may be formed of housings of one or more standard lengths, or of housings of one or more customized lengths, in order to comply with requirements of a particular application. Alternatively, the housings may be custom-designed to fit within a desired location or on a desired surface. For example, the housings may be formed of housings of twelve (12"), twenty-four (24"), thirty (30") or sixty (60") inches each. Additionally, the accessory openings in the housings may be modular or formed from regular dimensions, such as about three (3") inches long each, and adapted to receive the accessory modules, which are also predictably sized, such as about three (3") inches long each. The accessory openings may be provided at regular intervals, such as about six (6") inches on center, or at any interval, as desired. Furthermore, the housings may be formed of any suitable material, such as extruded metal. Any traditional fasteners or mounting apparatuses, such as screws, nails, brackets, snaps, hooks, clips or adhesives, may be used to mount the bus systems to a surface, or to mate the various components of the bus systems together.

According to another aspect of the present disclosure, a customizable bus system includes a housing for supporting accessory modules, a power module for supplying power to the accessory modules, and a control center or control panel. The housing may be formed from a spine base and a spine cover, and may include one or more accessory openings, mounting apertures, connecting wire apertures, one or more end caps, and one or more connectors. The spine base may be formed of any material, such as segments of extruded metal provided in varying lengths, and may also include one or more open ends which may be adapted to be closed with the end caps for a more pleasing visual appearance. The mounting apertures are adapted to slide over screws, carriage bolts, rotating clips or any other type of fasteners for securing the spine base onto an underside of a cabinet, a kitchen backsplash, or any other surface.

The control center or control panel may be located anywhere within the system module, such as in one of the accessory openings in a spine base, or as an end cap to a housing or spine assembly. The control center or control panel may link the system to and receive services from an existing junction box, and may also control the operation of one or more of the accessory modules, or the supply of power to the power circuits and/or one or more power conduits, or to individual accessory modules. The control center or control panel may be used to control some or all of the entire bus system, and may be operated manually by a user using a wired or wireless means, such as a remote control, or operated automatically.

According to yet another aspect of the present disclosure, a customizable bus system includes one or more modular sticks, each having one or more accessory units included therein. Each accessory unit may include lighting, electrical power, docking stations, charging stations, audio or video connections, Ethernet or Internet connections, or other utility services. The modular sticks may be joined together by one or more connectors, and may include a power module for supplying power to the accessory units. The connectors may be formed from any material and may be either rigid or flexible. Additionally, the connectors may be formed in such a manner that permits a modular stick or accessory units to be installed in a variety of locations or configurations. The accessory units may be combined together to form the modular stick by placing a connector between each pair of accessory units. Additionally, a connector may include one or more accessory units therein.

One advantage of the bus systems of the present disclosure is that they provide custom solutions to improve power distribution, lighting flexibility and music enjoyment in a variety of spaces. In particular, a homeowner can modify or upgrade an existing system by providing light modules, electrical outlet receptacles, wireless speakers, USB ports, charging stations, docking stations, and other accessories in a basic system backbone. Although rooms typically have a finite number and limited locations of electrical outlets and utility ports, the present disclosure solves these and other limitations by allowing for customization of the electrical capabilities in a space, such as a kitchen, as well as providing features such as audio speakers or video displays, motion sensors, lighting and USB ports where desired. In particular, lighting accessory modules and electrical outlet accessory modules can be added where they are needed most, to increase the safety and efficiency of workers in a space. Additionally, by including one or more control centers or control panels in a bus system, the entire bus system may be easily controlled from any location in a space, or even outside of the space.

Another advantage of the bus systems of the present disclosure is the ease in which such systems may be installed and operated. For example, the bus systems may be powered by a hard-wired connection to an existing power supply, or through a standard plug that can draw power from existing outlet receptacles such as those on a kitchen backsplash. Alternatively, the bus systems may be installed in such a manner that conceals exposed wires in an attractive fashion, for example, by drawing power or utility services from an embedded junction box. Furthermore, the system is easily mounted to the underside of a cabinet or along a wall without interfering with the existing architecture in a space. Moreover, the bus systems can be installed by either a qualified professional or an ordinary homeowner.

These and other advantages of the present disclosure, and of the currently preferred embodiments thereof, will become more readily apparent in view of the following detailed description of the currently preferred embodiments and the accompanying drawings.

DESCRIPTION OF THE SEVERAL VIEWS OF THE DRAWINGS

FIGS. 6A, 6B, 6C and 6D are perspective and side views of another embodiment of a customizable bus system of the present disclosure.

DETAILED DESCRIPTION

Figure 1A:
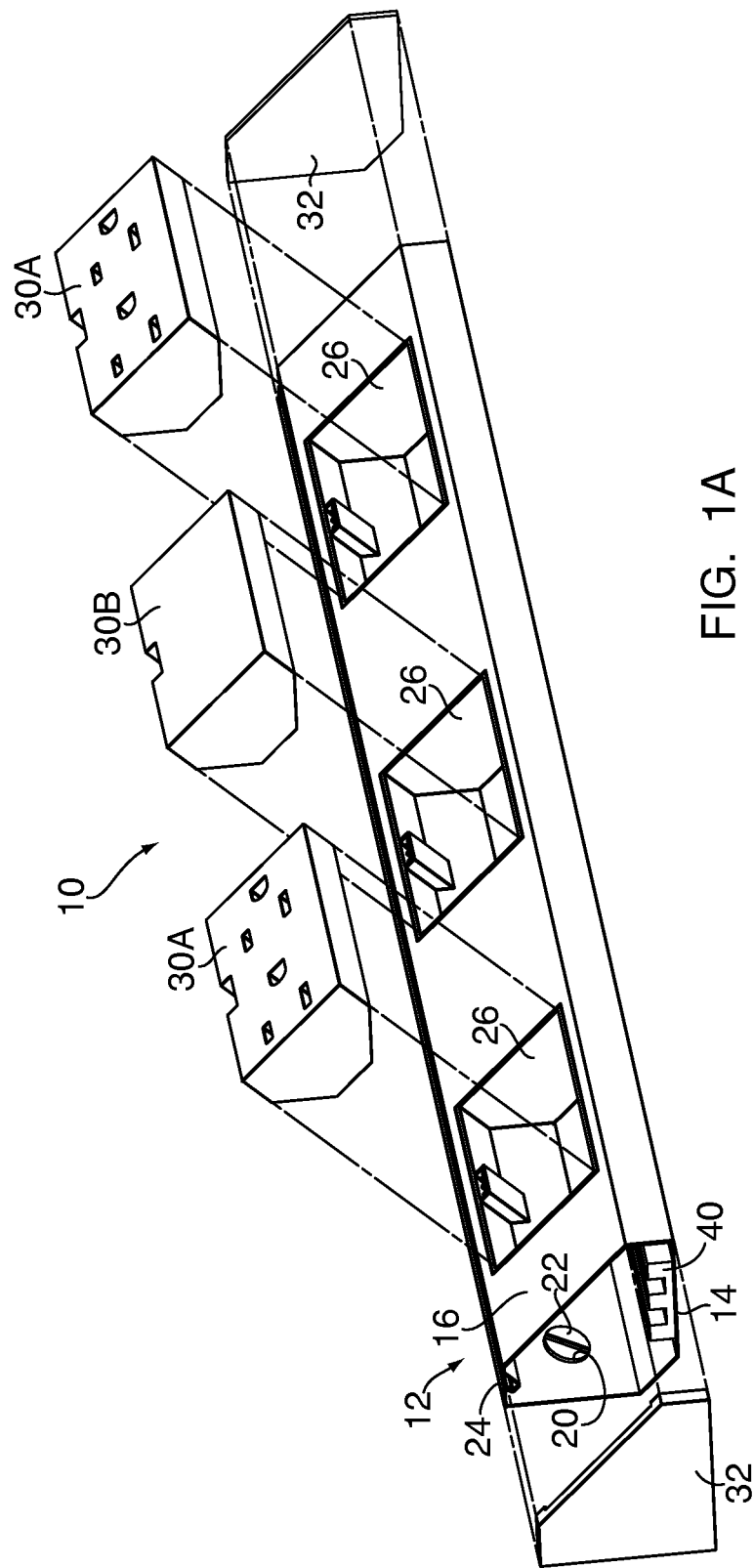
FIGS. 1A and 1B are front, perspective and side views of an embodiment of a customizable bus system of the present disclosure.
Figure 1B:
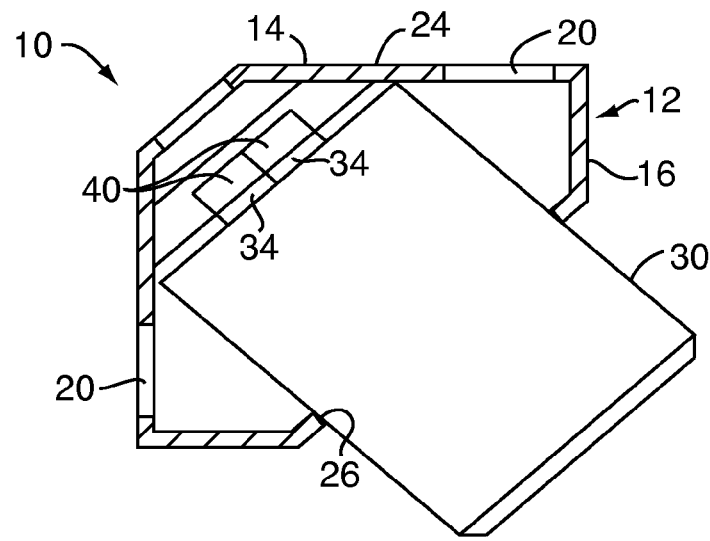

Referring to FIGS. 1A and 1B, a customizable bus system 10 has a housing 12 that includes a spine base 14 and a spine cover 16. The spine base 14 includes a plurality of mounting apertures 20 which may be used to mount the spine base 14 to a surface with fasteners 22. The spine base 14 also includes a plurality of clips 24 for connecting the spine cover 16 to the spine base 14. The spine cover 16 includes a plurality of accessory openings 26 that are adapted to receive and support a plurality of accessory modules 30A, 30B. The bus system 10 may also include end caps 32, which are used to close the open ends of the housing 12, and to give the bus system 10 a more pleasing visual appearance.

The bus system 10 also includes a power circuit 40 that may be disposed within an interior of the bus system 10 that is defined by the spine cover 16 and the spine base 14. The power circuit 40 is a conductive bar or other rigid electrical connector for mating with the electrical contacts 34 of the various accessory modules 30, which may plug into and connect to the power circuit 40 within the housing 12. Alternatively, the power circuit 40 may consist of multiple cables, wires, bars or other conductors that may be physically or operatively linked by connectors, such as male-female plug-type connections.

The accessory modules 30A, 30B are modular units that may be inserted into or removed from the various openings 26, and may be interchangeable. As is shown in FIG. 1, the bus system 10 includes two electrical outlet modules 30A and one panel blank 30B. The accessory modules 30A, 30B receive power through electrical contacts 34 that enable power transfer between the power circuit 40 within the bus system 10 and the accessory modules 30A, 30B. The accessory modules 30A, 30B may also include ejectors which enable a user to remove the accessory modules 30 from the openings 26. For example, the ejectors may include a spring-loaded member that urges the accessory module 30 from the bus system 10 when one or more of the ejectors is manually pressed. Alternatively, the accessory modules 30 may include ejectors which require the use of a tool in order to remove the accessory module 30 from the bus system 10.

The accessory modules 30A, 30B of the present disclosure enable the bus system 10 to provide a variety of functionality and features including, but not limited to, lighting elements in the form of linear, LED, tube or puck lights; two- or three-pronged outlet receptacles; audio speakers or ports; video monitors or ports; Ethernet or Internet cable ports; telephone ports, motion sensors; Bluetooth® transceivers; media player docking stations; and charging stations, for example, which may include direct charging connections that are hard-wired to the power circuit 40 or an induction charging system without any direct connections to the power circuit, and which may be used to charge portable items such as "smart phones" or cameras. The accessory modules 30A, 30B may receive power from the power circuit 40, and may also receive inputs via one or more wired or wireless means. For example, an accessory module 30A, 30B may include an audio speaker that receives power from a power circuit 40, and receives signals from an audio source that may be linked wirelessly, such as via Bluetooth® or wireless fidelity ("WiFi") transmission, or to a wired docking station. Moreover, panel blanks may be installed in accessory openings 26 where an accessory module is neither needed nor desired.

Plugs or hard-wired connections, or intrinsic sources such as internal batteries, solar cells or other systems and methods for obtaining or storing power, may be used to provide power to the power circuit 40. In addition to power, other utility services may be provided to the bus system 10 through wired means, such as coaxial, CAT-5, USB or other like connectors, or through wireless means, such as WiFi, Bluetooth® or other like systems and methods.

Additionally, power and services may be controlled at the manual direction of a user (i.e., through a switch, or based on signals transmitted by a remote control or over a network such as the Internet), or automatically, such as according to a preprogrammed schedule. For example, one or more of the accessory modules or a control center or control panel may also include a motion sensor that initiates or secures the operation of an accessory module, as necessary, based on the activity within a space, or the lack thereof.

In operation, the bus system 10 may be assembled by mounting the spine base 14 to a surface, such as the underside of a cabinet, using screws 22, brackets or other fasteners. The spine cover 16 may then be joined to the spine base 14 using clips 24 or other fasteners, which may rotate or otherwise mate the spine cover 16 to the spine base 14 to form the housing 12, or by snapping the spine cover 16 onto the spine base 14. Depending on the desired functionality of the bus system, the specific accessory modules 30 may then be selected and installed into the accessory openings 26 where desired, and the electrical contacts 34 of the various accessory modules 30 may be connected to the power circuit 40. Each accessory module 30 may include one or more utility receptacles or connections, such as one or more electrical outlet receptacles, an electrical receptacle and a telephone jack, or any other combination of utility services. Moreover, where an accessory module 30 is not desired in a particular accessory opening 26, as is shown in FIG. 1, a panel blank 30B may be installed.

Once installation of the bus system 10 is complete, and power has been provided to the power circuit 40, the bus system 10 may then be utilized in any manner desired by a user. For example, a standard plug of an appliance may be plugged into an electrical outlet receptacle; lighting may be provided via one or more lighting accessories; and music or other sounds may be played from an audio speaker.

Figure 2:
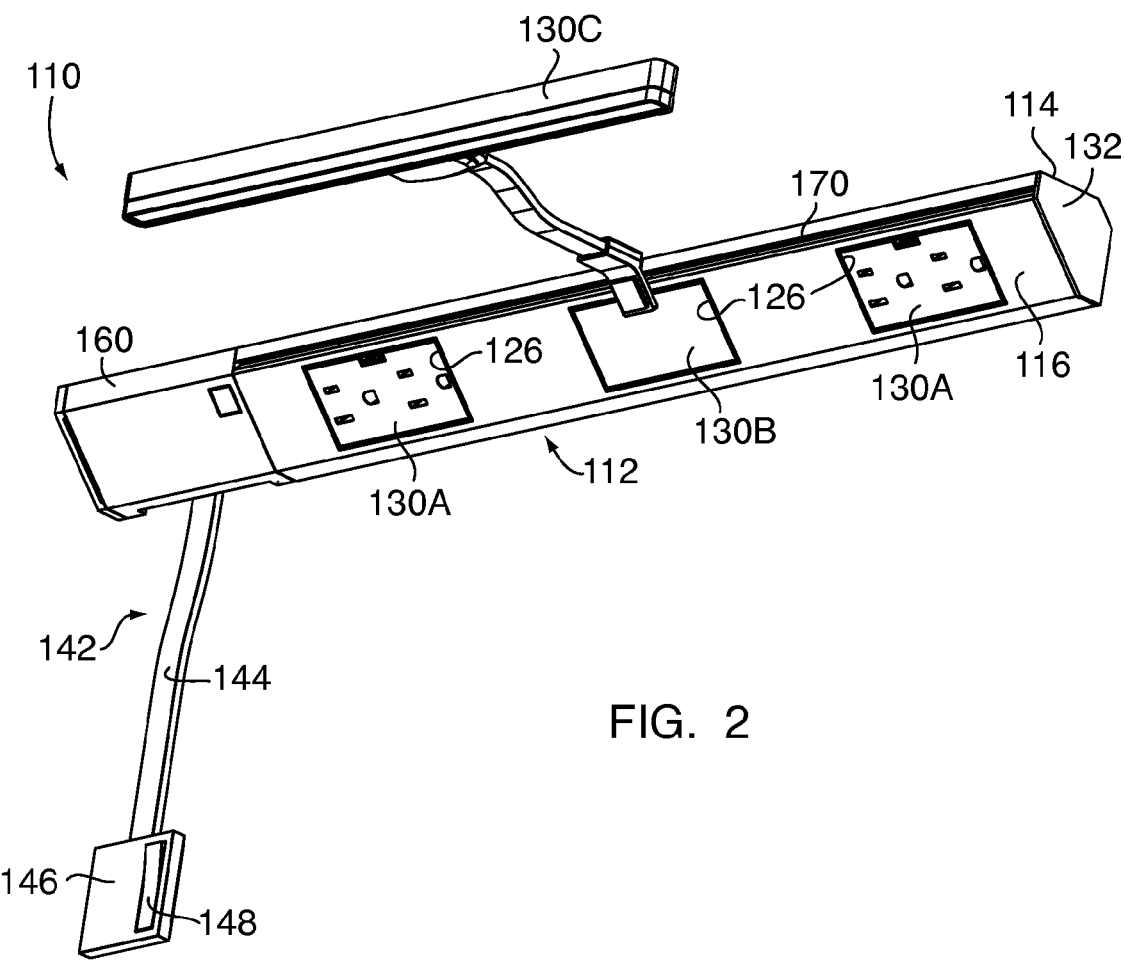
FIG. 2 is a perspective view of another embodiment of a customizable bus system of the present disclosure.

Referring to FIG. 2, an embodiment of a bus system is indicated by the numeral 110. The bus system 110 is substantially similar to the bus system 10 shown in FIGS. 1A and 1B. Except where otherwise noted, reference numerals preceded by the number "1" indicate elements that are similar to the elements of the bus system 10 shown in FIGS. 1A and 1B.

The bus system 110 includes a system module 112 and a power module 142. The system module 112 includes a spine base 114 and a spine cover 116, and is adapted to be mounted to an underside of a cabinet. The spine cover 116 includes a plurality of accessory openings 126 for receiving and supporting accessory modules 130. The system module 112 also includes an external rail 170 which runs along a length of the system module 112 for manually mounting accessories thereto. A power circuit 140 (not shown) is disposed within an interior of the system module 112, along a surface of the spine base 114. The power circuit 140 includes a variety of electrical connections for providing power to the accessory modules 130 that may be installed into the system module 112. An end cap 132 closes one end of the system module 112.

The bus system 110 also includes a plurality of accessory openings 126 in the spine cover 114, into which a plurality of accessory modules 130 may be installed. As is shown in FIG. 2, the bus system 110 includes two electrical outlet modules 130A and a panel blank 130B, as well as a linear light module 130C that is mounted to the external rail 170 and electrically connected to the panel blank 130B.

Power is provided to the bus system 110 by a power module 142, which delivers power via a hard-wired connector that extends from a junction box (not shown) in a wall. The hard-wired connector originates behind a faceplate 146 and extends through a power conduit 144 to the power circuit 140 within the system module 112. The faceplate 146 also includes a master switch 148. Utility service connections may be provided to the bus system via wired means, for example, using wires that also extend from the junction box (not shown) and through the power conduit 144 to the system module 112, or via wireless means, such as Bluetooth®, WiFi or the like.

The bus system 110 also includes a control center 160, which may be used to control the operation of one or more of the accessories 130A, 130B, 130C in the bus system 110. The control center 160 shown in FIG. 2 forms an end of the system module 112, and also mates with the power module 142. The control center 160 may include buttons or switches for local manual control, or wired or wireless means for remote or automatic control. Additionally, the control center 160 may be linked to each of the accessories 130A, 130B, 130C by wired means, such as wires or other connectors extending through the housing 112 of the bus system 110, or by wireless means, such as Bluetooth®, WiFi or the like. Therefore, a user may operate the control center 160 to issue control signals to the accessories 130A, 130B, 130C such as to turn on a light, to begin playing sounds from an audio speaker, or for any other purpose. The control center 160 may also be connected to the Internet or some other network for remote or automated control of accessories 130A, 130B, 130C.

Those of skill in the art would recognize that the control center 160 may include switches and/or other components to manually or automatically manage the operation of one or more of the accessories 130A, 130B, 130C. For example, the control center 160 may include a motion sensor that senses activity within the space where the bus system 110 is installed, and initiates or secures the operation of one or more of the accessories based on the activity in the space, or the lack thereof.

In operation, the bus system 110 shown in FIG. 2 may be assembled by mounting the spine base 114 to the underside of a cabinet, and joining the spine cover 116 to the spine base 114 to form the system module 112. Next, the control center 160 may be installed to an end of the system module 112, preferably the end that is nearest a power source, such as an existing junction box. A hard-wired connection may then be installed from the power source to the control center 160 through power conduit 144. Next, a faceplate 146 and master switch 148 may be installed, and any remaining accessory modules or panel blanks may be inserted into the spine cover 116. The power conduit 144, such as that shown in FIG. 2, provides the advantage of concealing unsightly wires from view. Alternatively, the bus system 110 may include a standard plug that extends from the system module 112 and may be inserted into a standard electrical outlet (not shown) to provide power to the bus system 110.

Once installation of the bus system 110 is complete, and power has been provided to the power circuit 140, the bus system 110 may then be utilized in any manner desired by a user. For example, a standard plug of an appliance may be plugged into an electrical outlet receptacle; lighting may be provided via one or more lighting accessories; and music or other sounds may be played from an audio speaker.

The bus systems of the present disclosure may provide support to a variety of accessories in a variety of different ways. For example, in addition to the standard accessory openings shown in FIG. 2, accessories may also be mounted to the bus systems using additional mounting features, in addition to or including external rail 170. Accessories that are mounted to such tracks may receive services from a power module through one or more apertures within the bus system, but may also be connected to the bus system through one or more other accessory modules.

Additionally, the bus systems of the present disclosure may include multiple power circuits which can operate at one or more voltage levels. For example, a bus system may include a first power circuit for powering lighting applications, a second power circuit for powering electrical outlet receptacles, and a third power circuit for powering other accessories. Moreover, the various power circuits may be supplied power from one or more power sources, such as multiple power modules 142. Providing power from multiple power sources may be necessary to satisfy code requirements or to provide additional safety or redundancy. Furthermore, the bus systems may include transformers to raise or lower the available voltage levels, as necessary, for a particular application, and the individual accessories installed into the bus systems may include their own intrinsic transformers, as necessary.

Figure 3:
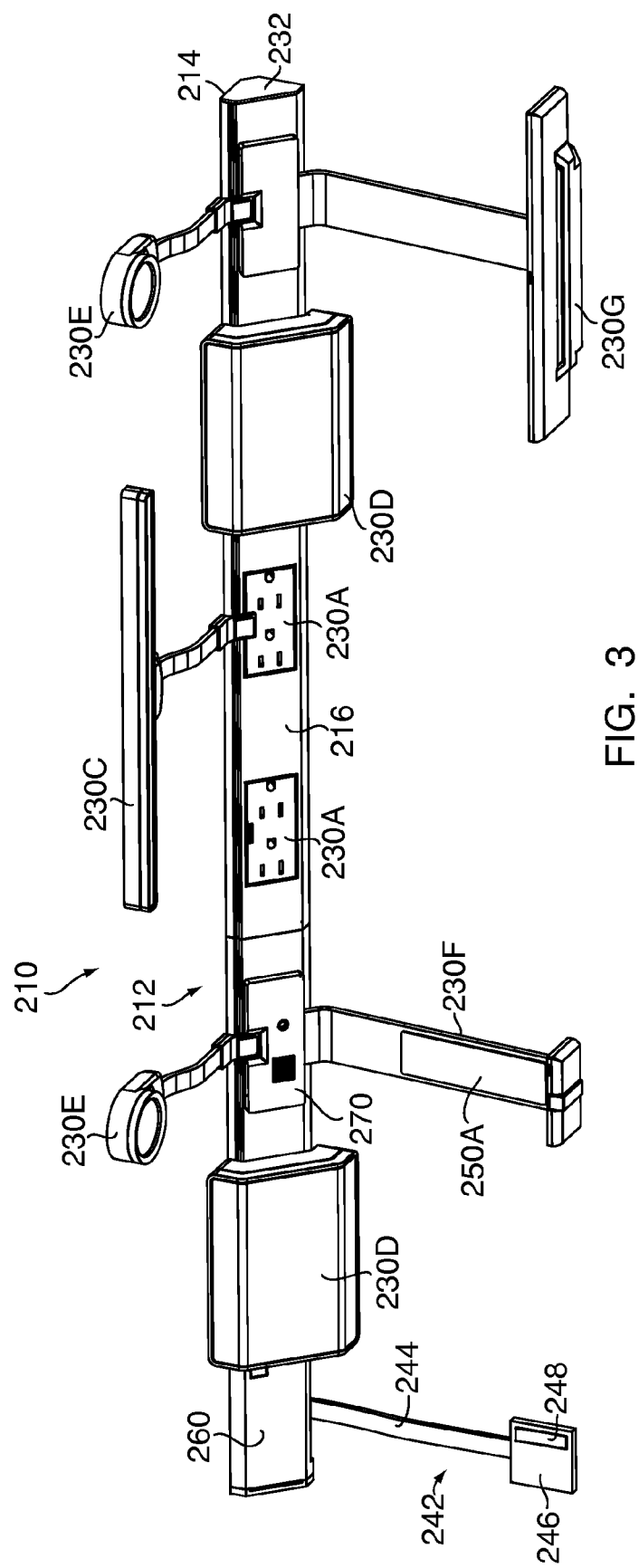
FIG. 3 is a perspective view of another embodiment of a customizable bus system of the present disclosure.

Referring to FIG. 3, an embodiment of a bus system 210 is shown. The bus system 210 is substantially similar to the bus system 110 shown in FIG. 2. Except where otherwise noted, reference numerals preceded by the number "2" indicate elements that are similar to the elements of the bus system 110 shown in FIG. 2 as having reference numerals that are preceded by the number "1."

The bus system 210 includes a system module 212 and a power module 242. The system module 212 includes a spine base 214 and a spine cover 216, and is adapted to be mounted to an underside of a cabinet. As is shown in FIG. 3, the bus system 210 includes two electrical outlet panels 230A, an audio speaker 230B, a light module 230C, two audio speakers 230D, two puck lights 230E, a docking station 230F for a media player 250A and a charging station 230G, which may include charging connections that are hard-wired to the power module 242, or an induction charging system which derives power from the power module 242 without a direct connection thereto.

The power module 242 provides power to the bus system 210 through a hard-wired connector that extends from behind a faceplate 246 covering an existing junction box (not shown), through a power conduit 244 to a power circuit 240 (not shown) within the bus system 210. The faceplate 246 also includes a master switch 248. The bus system 210 also includes a control center 260, which may be used to control the operation of one or more of the accessory modules 230 (230A-G shown in FIG. 3 and 230H shown in FIG. 4).

The bus system 210 further includes an external track 270 that extends substantially along the length of the system module 212. The external track 270 permits additional accessories to be linked to and physically supported by the bus system 210. As is shown in FIG. 3, linear light module 230C and puck lights 230E are mounted to the external track 270 in order to provide lighting to areas beneath the underside of a cabinet, and also to discrete locations or connection points on the system module 212, such as through an accessory panel 230 (230A-G shown in FIGS. 3 and 230H shown in FIG. 4). For example, the linear light module 230C and puck lights 230E may be connected to a power circuit or other source within the system module 212 that is connected to the power module 242 through apertures or other means. Alternatively, the linear light module 230C and puck lights 230E may be powered from independent sources, such as batteries or solar cells.

In operation, accessories may be mounted to the external track 270 after the bus system 210 has been assembled and mounted to a surface in a manner similar to that of the bus system 110 shown in FIG. 2. Accessories mounted to the external track 270 may be supported by the bus system 210 alone, or may be further mounted to the surface, such as the underside of a cabinet.

Once installation of the bus system 210 is complete, and power has been provided to the power circuit 240, the bus system 210 may then be utilized in any manner desired by a user. For example, a standard plug of an appliance may be plugged into an electrical outlet receptacle 230A; lighting may be provided via one or more lighting accessories 230C, 230E; music or other sounds, such as those generated by a media player 250A installed into docking station 230F, may be played from an audio speaker 230D; and a charging station 230G may be used to charge cameras, personal digital assistants ("PDA"), telephones (including "smart phones") or media players, such as through charging connections that are hard-wired to the power module 242, or an induction charging system which derives power from the power module 242 without a direct connection thereto.

The bus systems of the present disclosure may make power available at more than one voltage level, in order to provide accessories operating at different voltage levels in the same bus system. For example, the bus systems may include a first power circuit maintained at a first voltage level, and a second power circuit maintained at a second voltage level, or may include multiple power circuits maintained at a single voltage level. The power circuits may be maintained at separate voltage levels in a variety of ways. For example, the bus systems may include multiple power connections entering the housing, where each of the power connections maintains a separate power circuit at a particular voltage level. Additionally, a bus system may include a single power connection that is maintained at a single voltage level, and also include one or more transformers within the housing to increase or decrease the voltage, as necessary, for a particular application. Such transformers may, for example, include primary windings connected to a first power circuit that is maintained at a first voltage level, and secondary windings connected to a second power circuit that is maintained at a second voltage level, thereby providing independent sources of power at separate voltage levels from a single power source. Alternatively, the accessories of the present disclosure may include an onboard transformer that increases or decreases the voltage within that accessory, as necessary.

A bus system that makes power available at different voltage levels may be advantageous where high-voltage and low-voltage applications are desired together in the same location. Referring again to FIG. 3, it may be particularly advantageous to provide power to electrical outlet panels 230A at a first voltage level, such as 120 volts, and to provide power to linear light module 230C or puck lights 230E at a second voltage level, such as 24 volts. Additionally, accessories such as docking stations 230F or charging station 230G may include internal transformers or other features which would reduce the voltage levels, as necessary, in order to provide power to docking station 230F and media player 250A, or to charging station 230G.

Figure 4:
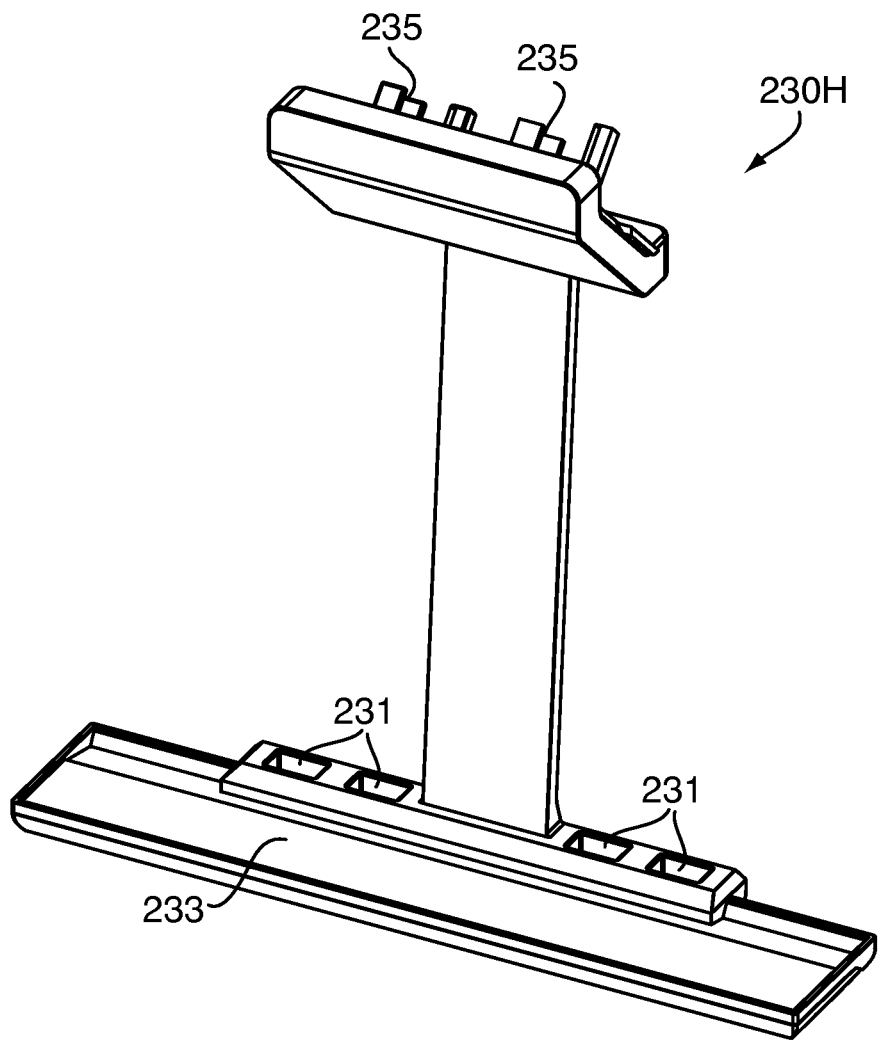
FIG. 4 is a perspective view of an accessory module for use in an embodiment of a customizable bus system of the present disclosure.

Accessories may be installed directly into accessory openings, or mounted to other accessories. An embodiment of a charging station 230H for use in a bus system of the present disclosure is shown in FIG. 4. The charging station 230G includes a plurality of electrical receptacles 231 and a tray 233 onto which electrical components may be placed. The electrical receptacles 231 may be of any standard form, such as a USB port, and may provide charging power to one or more electrical components placed on or near the tray 233. Alternatively, the tray 233 may include an induction charging system which provides power to one or more electrical components without a direct connection. The charging station 230G also includes electrical contacts 235, in the form of standard electrical plugs. Whereas some charging stations, such as the charging station 230G shown in FIG. 3, may be installed into an accessory opening of a bus system, the charging station 230H shown in FIG. 4 may be plugged into one or more standard electrical outlet receptacles, such as the electrical outlet panel 230A shown in FIG. 4, to provide a means to charge electrical appliances such as cameras, "smart phones" or PDAs.

Figure 5:
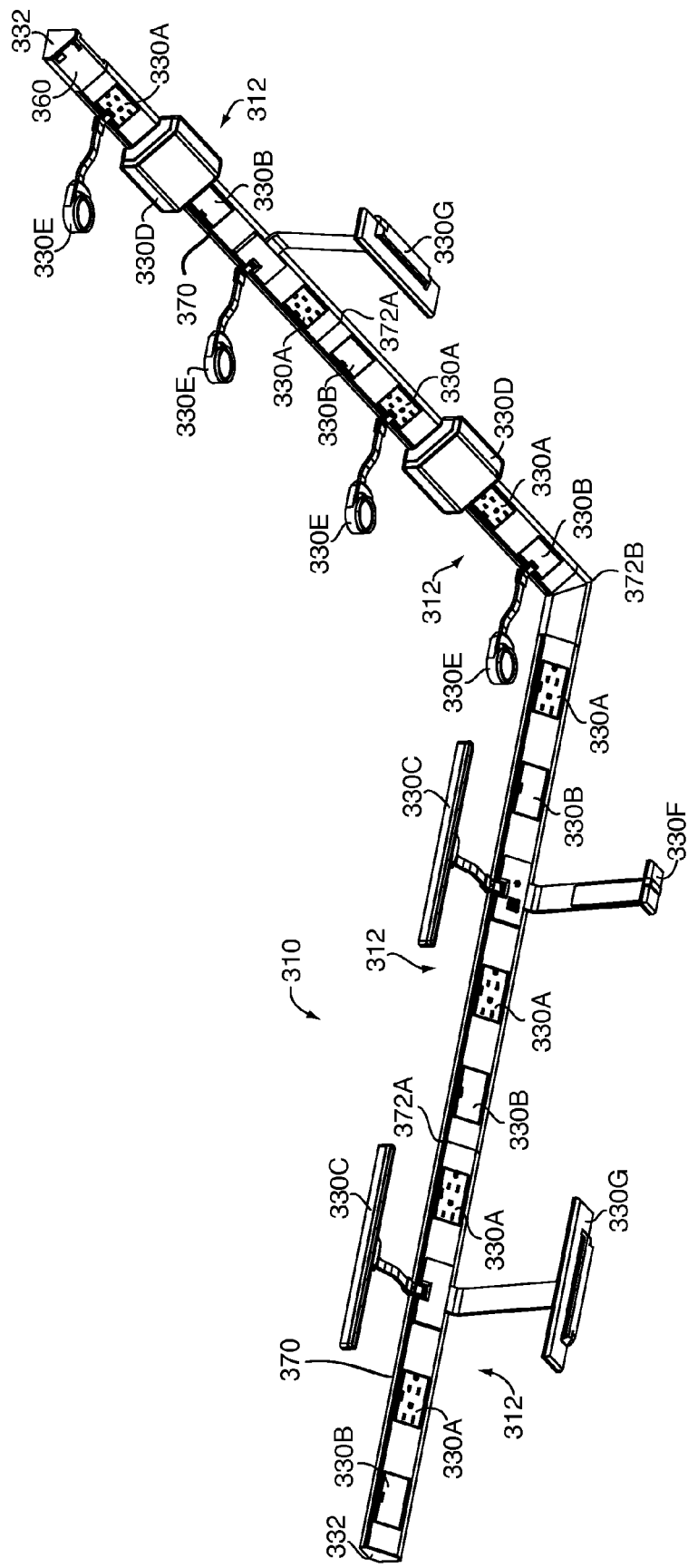
FIG. 5 is a perspective view of another embodiment of a customizable bus system of the present disclosure.

The bus systems of the present disclosure may be formed in a variety of configurations and dimensions in order to conform to the demands of desired applications. For example, bus systems may include one or more housings that may be physically and/or operatively linked to one another, such as by wired or wireless means. Referring to FIG. 5, an embodiment of a bus system 310 is shown. The bus system 310 is substantially similar to the bus system 210 shown in FIG. 3. Except where otherwise noted, reference numerals preceded by the number "3" indicate elements that are similar to the elements of the bus system 210 shown in FIG. 3 as having reference numerals that are preceded by the number "2."

The bus system 310 includes four housings 312, each including a spine base 314 and a spine cover 316, and are physically linked to one another by connectors 372. The housings 312 each include a plurality of accessory openings, into which a plurality of accessories 330 are installed. Additionally, each of the housings 312 includes a external track 370, to which a plurality of accessories 330 is joined. The operation of one or more the accessories 330 may be controlled by a single control center 360. In the bus system 310 shown in FIG. 4, four electrical outlet receptacles 330A, six panel blanks 330B, two linear light modules 330C, two audio speakers 330D, four puck lights 330E, one docking station 330F and two charging stations 330G are included. Additionally, the housings 312 of the bus system 310 are connected by two straight-line connectors 372A and a right-angle connector 372B, which enables the bus system to be installed into a corner configuration, such as the underside of a cabinet.

The bus systems of the present disclosure may be formed in a variety of lengths or arrangements using one or more segments or housings that may be joined by one or more connectors. The connectors may be formed from any suitable material and may be either rigid or flexible. Preferably, the connectors are substantially hollow, in order to permit power or service connections to extend therethrough and between one or more segments or housings. Moreover, the connectors themselves may take a variety of shapes, and may be rounded or otherwise formed at any angles, including right angles, in order to permit a bus system to be installed in corners or other configurations or orientations. A flexible bellows-type connector, for example, may permit two or more segments or housings to be installed on surfaces of different planes, and to be both physically and operatively joined together to act as a single system.

The bus systems of the present disclosure may also include housings and accessories that are formed together into a single contiguous unit. The units may be interchangeably provided as modular units having independent structural features, that may be installed into locations where needed.

Referring to FIGS. 6A-6D, an embodiment of a bus system 410 is shown. The bus system 410 is substantially similar to the bus system 310 shown in FIG. 5. Except where otherwise noted, reference numerals preceded by the number "4" indicate elements that are similar to the elements of the bus system 310 shown in FIG. 5 as having reference numerals that are preceded by the number "3."

Referring to FIG. 6A, a bus system 410 includes a pair of modular sticks 412A, 412B, a pair of mounting hooks 414A, 414B and a connector 472. Each of the modular sticks 412A, 412B is formed of a single integral unit that includes a base 416A, 416B for installing the modular sticks 412A, 412B onto the mounting hooks 414A, 414B and also includes at least one accessory 430, which may provide functionality in the form of lighting, access to electrical power, audio or video connections, Ethernet or Internet connections, or the like. The mounting hooks 414A, 414B are mounted to the underside 492 of a cabinet 490 with screws 422. The modular sticks 412A, 412B are linked by a connector 472.

Referring to FIGS. 6B and 6C, the modular stick 412B includes a base 416B, a cover 474B and a lens 476B, as well as a power circuit 440B and a lighting accessory 430B. The cover 474B is mounted to the base 416B, and the cover 474B and the base 416B define an interior in which a power circuit 440B is disposed. The power circuit 440B provides electrical power to the electrical connections 434B of the lighting accessory 430B. Additionally, the lens 476B is formed integral to the cover 474B, and substantially covers the lighting accessory 430B.

Figure 6D:
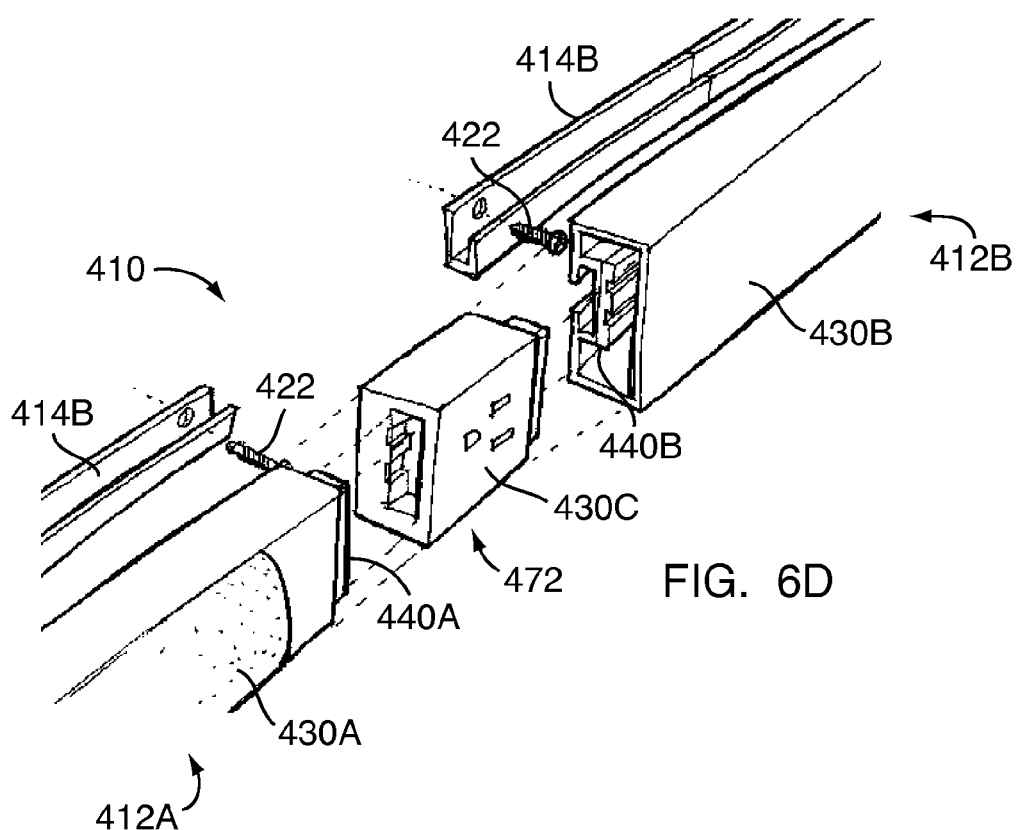

Referring to FIG. 6D, the bus system 410 includes two modular sticks 412A, 412B, two mounting hooks 414A, 414B and a connector 472. The modular stick 412A includes an audio speaker 430A, and the modular stick 412B includes a lighting module 430B. Additionally, the connector 472 also includes an electrical outlet receptacle 430C. The connector 472 provides a physical and operative connection between the modular sticks 412A, 412B, including a conductive link between the power circuit 440A of the modular stick 412A and the power circuit 440B of the modular stick 440B.

The bus systems of the present disclosure may include one or more modular sticks, which can be formed of any length, and can include one or more individual accessories mounted thereon. For example, the modular sticks may include lighting elements in the form of puck, tube or LED lights; speakers; docking stations; electrical outlet modules including one or more electrical outlet receptacles, or any other accessory. Furthermore, in a bus system having more than one modular stick, the bus system may include a power module that may provide power to one of the modular sticks, which may be adapted to transfer power to the other modular sticks, such as through a connector. One or more of the modular sticks may also include a control center that may control the operation of one or more of the accessories which may be included in other modular sticks.

In operation, the bus system 410 may be assembled by installing the spine bases 414A, 414B to one or more surfaces 492, such as the underside of a cabinet. One or more modular sticks 412A, 412B may be provided, with one or more connectors 472 used where necessary to combine the modular sticks 412A, 412B. Next, the modular sticks 412A, 412B may be mounted to the spine bases 414A, 414B, and power may be provided, for example, by a standard plug that can draw power from one or more existing electric outlet receptacles, from hard-wired connections, or from intrinsic sources such as internal batteries, solar cells or other systems and methods for obtaining or storing power.

Once installation of the bus system 410 is complete, and power has been provided to the power circuits 440A, 440B, the bus system 410 may then be utilized in any manner desired by a user. For example, a standard plug of an appliance may be plugged into an electrical outlet receptacle; lighting may be provided via one or more lighting accessories; and music or other sounds may be played from an audio speaker. Moreover, if the bus system 410 does not include a desired accessory or feature, then one or more of the modular sticks 412A, 412B may be removed and replaced with one or more other modular sticks that include the desired accessory or feature.

Figure 7:
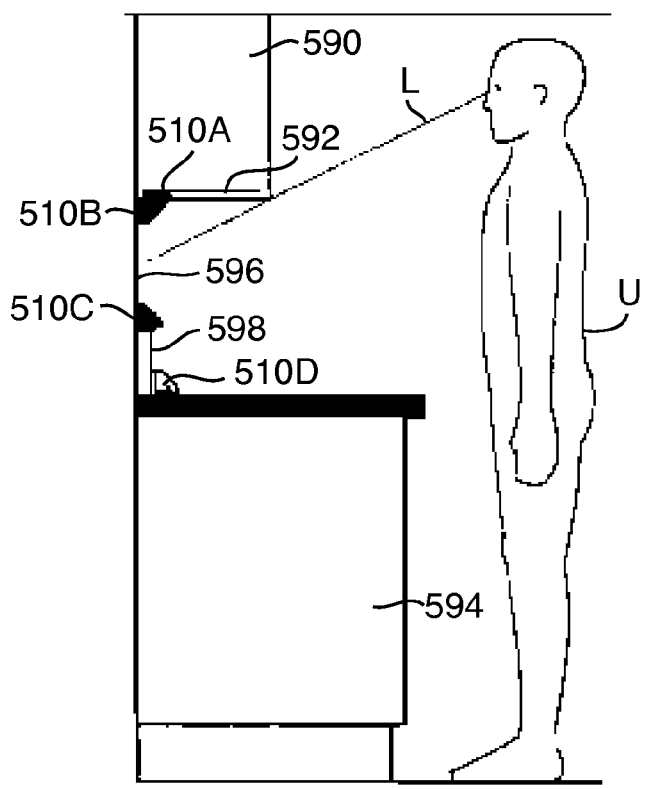
FIG. 7 is a side view of a standard workspace, showing preferred locations where an embodiment of a customizable bus system of the present disclosure may be installed thereon.

The bus systems of the present disclosure may be installed in a variety of locations in any room or workspace, such as a kitchen or a work room, and the location may be selected based on the desired use of the system or the preferences of the user. Referring to FIG. 7, a plurality of locations 510A, 510B, 510C, 510D for installing a bus system of the present disclosure are identified with respect to a cabinet 590 and a counter 594 in a kitchen. Location 510A, which is in a recess in the underside 592 of the cabinet 590, and location 510B, which is along a backsplash 596, also provide the advantage of concealing the bus system and accessories from the view of a user U, as defined by the line of sight L. Locations 510A and 510B may also be preferred if the bus systems are intended to provide lighting to the counter 594, or if power and services are available from behind or through the cabinet 590 or backsplash 596. Location 510C, which is atop a ledge 598 along the counter 594, and location 510D, which is atop the counter 594, places the bus system and accessories within the field of view of a user U.

The bus systems of the present disclosure may provide power at one or more voltage levels for use by accessories installed into the bus systems, or for appliances or other applications that may plug into electrical outlet receptacles in the bus systems. The bus systems may receive power from one or more sources at one or more voltage levels, through one or more power circuits or other means for providing power. For example, the bus systems may include a power circuit operating at a single voltage, or may also include both a high voltage bar and a low voltage bar. Alternatively, the bus systems may receive power at one voltage level and provide one or more transformers to increase or decrease the voltage level for particular accessories as necessary. Furthermore, the individual accessories may include internal transformers to increase or decrease the voltage levels, as necessary, for use by a particular accessory.

Components of the bus systems of the present disclosure may be formed of any dimensions, as necessary, to conform to a desired application. For example, the spine bases, spine covers and/or housings of the bus systems may be formed from standard lengths, or may be customized to fit in a particular location where the bus systems are needed. The bus systems may also include components such as connectors, face plates, and others which enable the bus systems to remain continuous along surfaces of varying geometries, such as to bend around corners. Furthermore, the bus systems of the present disclosure may be mounted flush against surfaces, or at various angles with respect to the surfaces using brackets or other appropriate connectors, based on the particular applications for which the bus systems are to be used, and may include any needed transition pieces to accomplish this effect. The individual accessory modules within a bus system may also be configured to have angled directional features, which may align or direct light or sound in a particular direction.

The bus systems of the present disclosure may be mounted in a variety of locations. For example, as is shown in FIG. 7, bus systems may be installed beneath a cabinet and/or along a backsplash, which would conceal the bus system from the fields of view of most users, and may make the bus systems more attractive for use in kitchens. Alternatively, bus systems may be installed on or along a countertop, within the field of view of users. Such an installation may be particularly valuable along workbenches and in other locations where concealing the bus systems from view is neither desired nor required. Moreover, the bus systems may be installed in kitchens or in any other workspace, such as garages, laboratories, dormitories, classrooms or in any other area where improved access to power and other services is desired.

Figure 8A:
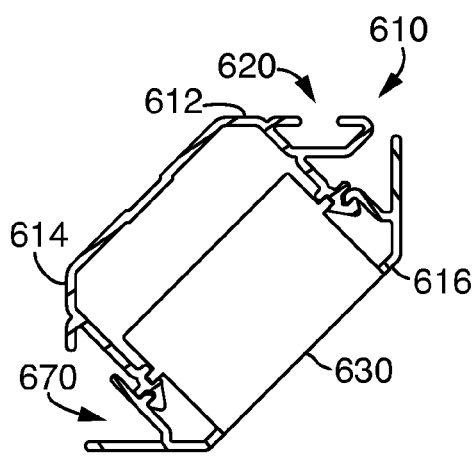
FIG. 8A is a side view of an embodiment of a customizable bus system of the present disclosure.
Figure 8B:
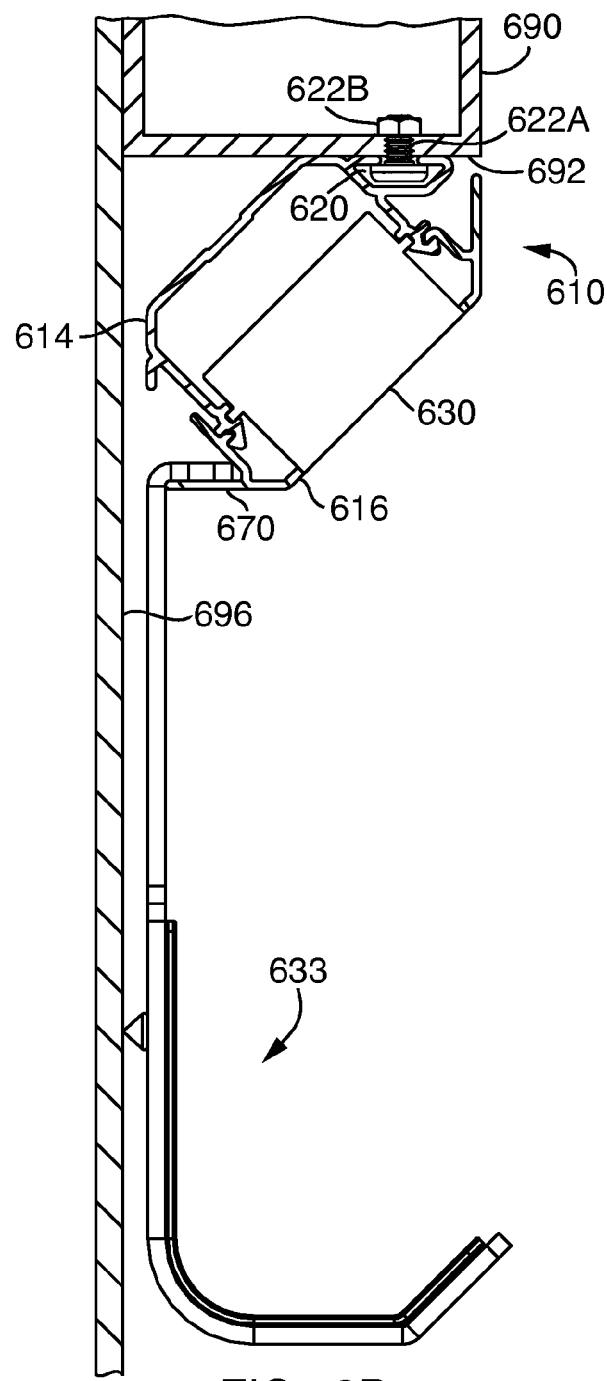
FIG. 8B is a side view of a standard workspace, showing the embodiment of the customizable bus system of FIG. 8A installed thereon.

Referring to FIGS. 8A and 8B, an embodiment of a bus system 610 is shown. The bus system 610 is substantially similar to the bus systems 310, 410, 510A, 510B, 510C, 510D shown in FIGS. 5, 6A-6D and 7. Except where otherwise noted, reference numerals preceded by the number "6" in FIGS. 8A and 8B indicate elements that are similar to the elements of the bus system 310 shown in FIG. 5 as having reference numerals that are preceded by the number "3," similar to the elements of the bus system 410 shown in FIGS. 6A-6D as having reference numerals that are preceded by the number "4," or similar to the elements of the bus systems 510A, 510B, 510C, 510D shown in FIG. 7 as having reference numerals that are preceded by the number "5."

Referring to FIG. 8A, a side view of the bus system 610 is shown. The bus system 610 includes a housing 612 having a base 614 and a cover 616, and is adapted to accommodate an accessory module 630. The bus system 610 further includes a mounting rail 620 for mounting the bus system 610 to an underside of a cabinet. The mounting rail 620 may extend along some or all of the length of a mounting surface of the bus system 610, and may be sized or shaped to accommodate one or more traditional fasteners or mounting apparatuses, such as a head of a carriage bolt, a screw or a nail, to mount the bus system 610 to a surface.

The bus system 610 of FIG. 8A also includes an external track 670 that may be utilized to mount or hang a shelf or other external accessory from a bus system 610 mounted in place beneath a cabinet or other surface. The embodiment of the bus system 610 of FIG. 8A includes a flat or substantially flat track 670 from which external accessories may be hung. The type and shape of the track for accommodating the mounting of external accessories is not limited to flat or substantially flat surfaces, however.

Referring to FIG. 8B, the bus system 610 is shown as installed in place on an underside 692 of a cabinet 690 and along a backsplash 696. The bus system 610 is installed with a fastener 622A, such as a screw or carriage bolt, and secured with a nut 622B, such that a head of the fastener 622A is positioned within the mounting rail 620.

As is shown in FIG. 8B, the bus system 610 includes a shelf 633 hanging from the external track 670. However, the external tracks 670 of the bus systems 610 of the present disclosure may be used to mount any type of external accessories or features. For example, some features that may be mounted to the bus system 610 via the track 670 include active, powered external accessories, such as charging stations, docking stations, speakers, monitors or lights, which may be powered from one or more power circuits or buses within the housings 612 or from external sources, as well as passive external accessories such as shelves or other platforms for providing structural support to components or tools to be utilized in any operation conducted beneath or in the vicinity of the bus system. Where the bus system 610 is installed in a kitchen, a cookbook easel, spice rack other relevant cooking accessory may be mounted to or hung from track 670.

Figure 9A:
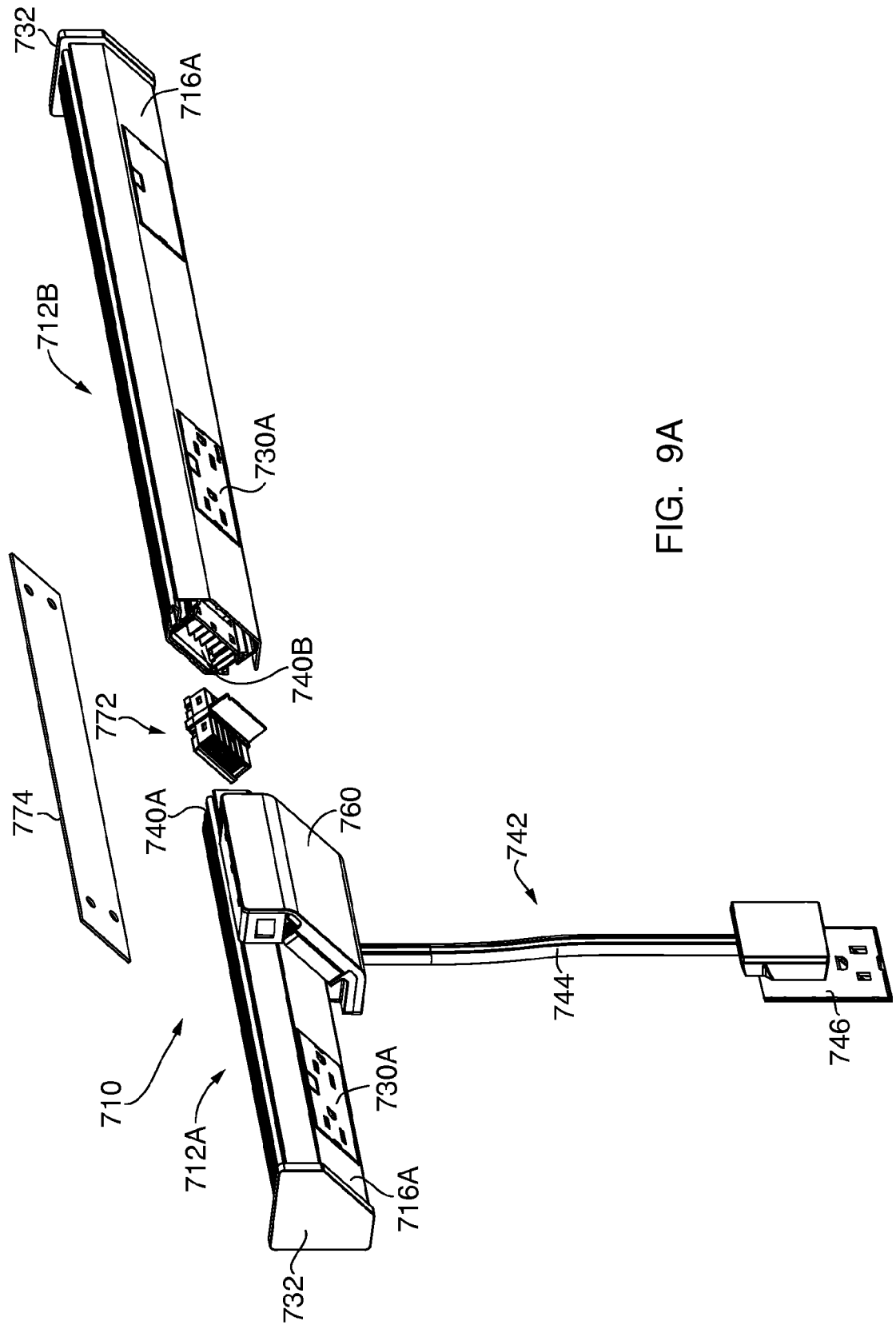
FIGS. 9A, 9B and 9C are perspective views of other embodiments of a customizable bus system of the present disclosure.
Figure 9B:
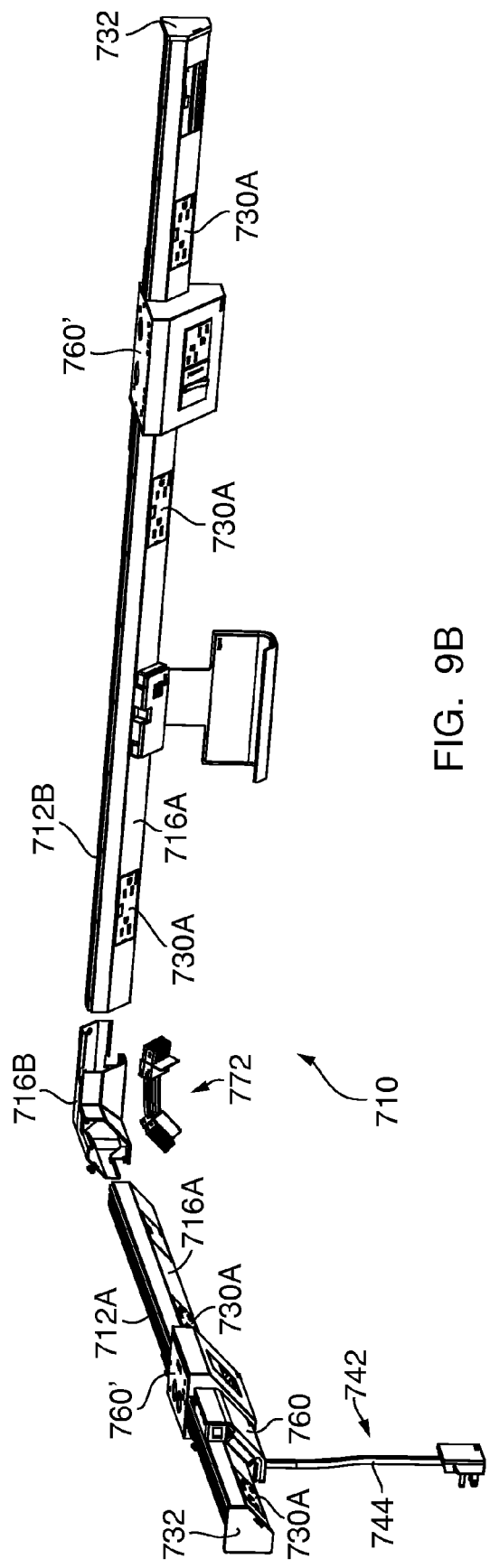
Figure 9C:
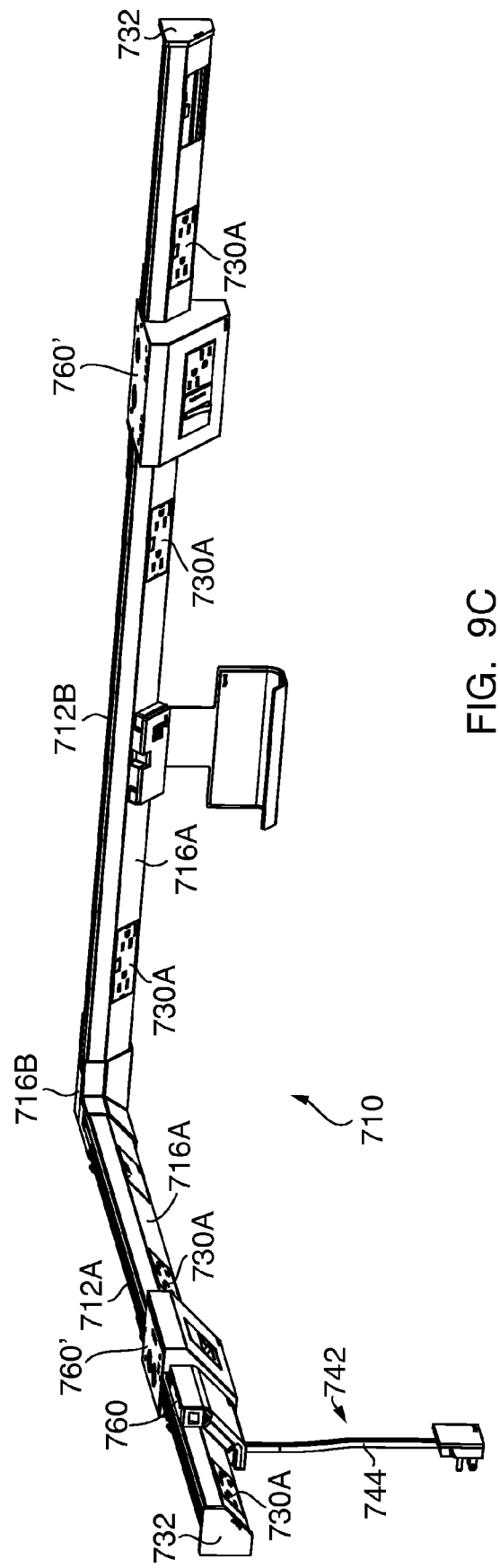

As is set forth above, the bus systems of the present disclosure may be formed in a variety of lengths or arrangements using one or more segments or housings that may be joined by one or more connectors, and mounted to or installed on surfaces in a variety of configurations. Referring to FIGS. 9A, 9B and 9C, other embodiments of a bus system according to the present disclosure are shown. Except where otherwise noted, reference numerals preceded by the number "7" in FIGS. 9A, 9B and 9C indicate elements that are similar to the elements of the bus system 310 shown in FIG. 5 as having reference numerals that are preceded by the number "3," similar to the elements of the bus system 410 shown in FIGS. 6A-6D as having reference numerals that are preceded by the number "4," similar to the elements of the bus systems 510A, 510B, 510C, 510D shown in FIG. 7 as having reference numerals that are preceded by the number "5," or similar to the elements of the bus system 610 shown in FIGS. 8A and 8B as having reference numerals that are preceded by the number "6."

Referring to FIG. 9A, the bus system 710 includes a pair of housings 712A, 712B. Each of the housings 712A, 712B features a cover 716A, 716B and an end cap 732. The housing 712A is powered from power module 742, which includes a power conduit 744 having features for receiving power from a standard electrical outlet 746, such as a plug, and mates with control center 760. The housing 712B includes an electrical outlet panel 730A.

In operation, the housings 712A, 712B of the bus system 710 shown in FIG. 9A may be installed or mounted to surfaces or independently, such as with traditional fasteners or mounting apparatuses, and electrically connected to one another by way of connector module 772, which has connections for electrically linking power connection 740A of housing 712A and power connection 740B of housing 712B. The connector module 772 shown in FIG. 9A includes pairs of female connectors, and the power connections 740A, 740B include corresponding pairs of male connectors for mating with the connector module 772, although any type of connector between the connector module 772 and the power connections 740A, 740B may be used in accordance with the present disclosure. As is shown in FIG. 9A, the housing 712A receives power from power module 742 through control center 760, and transfers power to housing 712B through the connector module 772, without requiring any external wire connections between the two housings 712A, 712B.

Additionally, as is also shown in FIG. 9A, a mechanical coupling 774 may be installed in order to mechanically bind housing 712A to housing 712B. The mechanical coupling 774 may be mounted to housing 712A or to housing 712B using one or more standard fasteners, such as snaps, screws or clips.

The connector module 772 shown in FIG. 9A may take any form and may have any combination of couplings, such as male-male, female-female, or male-female, for mating with corresponding power connections 740A, 740B within housings 712A, 712B. Additionally, the connector module 772 may transfer power at one or more different voltage levels, including high voltage (e.g., approximately 120 volts), low voltage (e.g., approximately 24 volts) or any other voltage level. Furthermore, the connector module 772 may include one or more grounding terminals or other features.

Additionally, although the connector module 772 shown in FIG. 9A is shown as transferring power between housing 712A and housing 712B, such connectors may be utilized to transfer any data, signals or other information between housings, such as audio, video, Ethernet or Internet connections, and may include one or more receptacles or portals for accomplishing such transfers.

The bus systems of the present disclosure may include connectors, such as the connector module 772 shown in FIG. 9A, of any shape or form. Referring to FIG. 9B, a bus system 710 includes housings 712A, 712B arranged in a substantially right angle. The housings 712A, 712B of FIG. 9B are similar to the housings 712A, 712B of FIG. 9A, and are electrically connected via a connector module 772, which is shaped corresponding to the angle between the housings 712A, 712B.

As with the bus system 710 shown in FIG. 9A, the housings 712A, 712B may be installed or mounted to surfaces independently, such as with traditional fasteners or mounting apparatuses, and electrically connected to one another by way of connector module 772. Once the housings 712A, 712B have been electrically linked with the connector module 772, an angled cover 716B may be installed over the connector module 772. As is shown in FIG. 9B, housing 712A is powered from power module 742, which includes a plug connection for receiving power from a standard external power source, through control center 760. Meanwhile, housing 712B does not include a plug connection, and instead is powered from housing 712A through the connector module 772. Referring to FIG. 9C, the bus system 710 of FIG. 9B is shown as installed, with the angled cover 716B over the connector module 772 between the housings 712A, 712B.

Although the housing 712A shown in FIG. 9B includes a control center 760 that is powered from power module 742, which receives power from a standard external power source through power conduit 744, the bus systems of the present disclosure may receive power through hard-wired connections, and need not include power modules, power conduits or other like features. For example, the bus systems may be powered from hard-wired connections to control centers, such as hard-wired connections through external or mounting surfaces of control centers 760' shown in FIG. 9B or FIG. 9C.

Furthermore, although housing 712A includes both control center 760 and control center 760', the housings of the present disclosure need not include multiple control centers. Likewise, although housing 712A includes control center 760 and control center 760', and housing 712B includes control center 760', bus systems of the present disclosure which feature multiple housings may include a single control center 760 or control center 760' that controls the operation of the respective accessories, accessory panels and/or accessory modules in multiple housings, or any other features of the bus systems.

Moreover, although the housings 712A, 712B are shown at a substantially right angle in FIGS. 9B and 9C, the housings 712A, 712B may be formed at any angles, in order to permit a bus system to be installed in corners or other configurations or orientations, and are not limited to right angles or corners. Accordingly, connectors, such as the connector module 772 shown in FIG. 9B, may also be rounded or formed at any angle, as necessary, in order to electrically connect the housings 712A, 712B to one another, and to be both physically and operatively joined together to act as a single system. The connector 772 may be a single, contiguous unit, such as is shown in FIG. 9A, or may consist of multiple parts connected to one another via wires or other electrical connections, such as is shown in FIG. 9B. A connector comprising a flexible connection between the couplings, such as the connector 772 shown in FIG. 9B, may be particularly valuable where the housings 712A, 712B are arranged to be formed at an angle.

The components of the bus systems of the present disclosure may be formed from a variety of materials, such as steel, plastics, or composites, as is desired by the user. For example, the spine bases, spine covers and/or housings of the bus systems of the present disclosure are preferably formed from extruded metal. The accessory openings and/or the mounting apertures are preferably stamped or punched. The end caps are preferably molded from plastic and may have a finish intended to match or contrast with the housings of the present disclosure. Furthermore, the power circuits of the present disclosure need not be continuous bars that extend throughout the length of the bus system. Bus systems may include one or more power circuits or other conductors within the bus system, which may be linked to a power source by one or more other connectors. Furthermore, although the dimensions of the accessory modules may conform to those of an accessory opening, the accessory modules may also be mobile, and may translate within an accessory opening in the bus system, in order to provide further flexibility and mobility where needed. Moreover, in addition power or other utilities, an accessory module may provide functionalities which do not require power or other utilities, as well. For example, an accessory module may include an adjustable frame or other hardware that may provide a platform or other support for a cookbook, an instruction manual or other items. The frame may extend from a bus system and may rotate or translate in any direction, as necessary.

The systems and methods disclosed herein may be used to provide power, utilities or other accessories in a manner that is flexible and more efficient than systems or methods according to the prior art. It should be understood that, unless otherwise explicitly or implicitly indicated herein, any of the features, characteristics, alternatives or modifications described regarding a particular embodiment herein may also be applied, used, or incorporated with any other embodiment described herein. Also, it should also be understood that the accompanying drawings are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As may be recognized by those of ordinary skill in the pertinent art based on the teachings herein, numerous changes and modifications may be made to the above-described and other embodiments of the present disclosure without departing from the spirit of the invention as defined in the claims. Accordingly, this detailed description of currently preferred embodiments is to be taken in an illustrative, as opposed to a limiting sense.

Although the invention has been described and illustrated with respect to exemplary embodiments thereof, the foregoing and various other additions and omissions may be made therein and thereto without departing from the spirit and scope of the present disclosure.

The invention claimed is:

1. A bus system comprising:
a housing including a plurality of accessory openings;
a first power circuit disposed within the housing;
a second power circuit disposed within the housing, the second power circuit being separate from the first power circuit;
a first accessory module comprising at least one electrical outlet receptacle and electrical contacts on a side of the first accessory module substantially opposite the at least one electrical outlet receptacle, the electrical contacts in electrical communication with the at least one electrical outlet receptacle; and
a second accessory module that does not include an electrical outlet receptacle, the second accessory module comprising electrical contacts;
wherein the first and second accessory modules are adapted to be releasably installed to said housing through any one of the plurality of accessory openings;
wherein when installed through one of the plurality of accessory openings, the electrical contacts of the first accessory module comprising the at least one electrical receptacle include contact surfaces that automatically contact corresponding contact surfaces of only the first power circuit to connect the at least one electrical outlet receptacle to the first power circuit; and
wherein when installed through one of the plurality of accessory openings, the electrical contacts of the second accessory module include contact surfaces that automatically contact corresponding contact surfaces of only the second power circuit to connect the second accessory module to the second power circuit.

2. The bus system of claim 1, the housing further including a mounting rail.

3. The bus system of claim 1, the housing further including an external track configured to allow releasable attachment of an external accessory to the housing.

4. The bus system of claim 2, wherein the mounting rail extends along at least a portion of a mounting surface of the housing, and
wherein the mounting rail includes a channel sized to accommodate a head of at least one of a carriage bolt, a screw and a nail.

5. The bus system of claim 3, wherein the external track comprises a substantially flat surface extending along at least a portion of a length of the housing.

6. The bus system of claim 5, wherein the external track extends along the entire length of the housing.

7. The bus system of claim 1, wherein the second accessory module includes a speaker and the speaker is adapted to receive a wireless transmission.

8. The bus system of claim 1, wherein the bus system includes a power connection adapted to energize at least one of the first power circuit or the second power circuit from a power source.

9. The bus system of claim 3, further comprising an external accessory for mounting to the housing via the external track.

10. The bus system of claim 9, wherein the external accessory is selected from the group consisting of: a shelf, a puck light, and a linear light.

11. The bus system of claim 9, further comprising a second external accessory, wherein each of the external accessory and the second external accessory is selected from the group consisting of: shelf, puck light, and linear light.

12. The bus system of claim 9, wherein the external accessory is powered through one of the plurality of accessory openings when mounted to the housing via the external track.

13. The bus system of claim 1, wherein the first power circuit is configured to provide AC power and the second power circuit is configured to provide DC power.

14. The bus system of claim 1, wherein both the first power circuit and the second power circuit are configured to provide AC power.

15. A bus system comprising:
a housing including a plurality of accessory openings;
a first power circuit disposed within the housing;
a second power circuit disposed within the housing, the second power circuit being separate from the first power circuit;
a first accessory module comprising an electrical outlet receptacle adapted to be releasably installed into one of the accessory openings, the first accessory module including electrical contacts disposed on a side of the first accessory module disposed inside the housing when the first accessory module is installed into one of the accessory openings; and
a second accessory module that does not include an electrical outlet receptacle and is adapted to be releasably installed into one of the accessory openings, the second accessory module comprising electrical contacts disposed on a side of the second accessory module disposed inside the housing when the second accessory module is installed into one of the accessory openings;
wherein contact surfaces of the electrical contacts of the first accessory module automatically contact corresponding contact surfaces of only the first power circuit to connect the first accessory module to the first power circuit when the first accessory module is releasably installed into one of the accessory openings;
wherein contact surfaces of the electrical contacts of the second accessory module automatically contact corresponding contact surfaces of only the second power circuit to connect the second accessory module to the second power circuit when the second accessory module is releasably installed into one of the accessory openings; and
wherein:
the housing further includes a mounting rail configured to allow the housing to attach to an underside of a surface to which the housing is to be secured;
a head of each of at least one fastener fits within an opening in the mounting rail;

the housing further includes an external track comprising a substantially flat surface that allows attachment of an external accessory thereto; and the mounting rail and the external track are on opposite sides of the housing.

16. The bus system of claim 15, further comprising an external accessory for mounting to the housing via the external track.

17. The bus system of claim 16, wherein the external accessory is selected from the group consisting of: a shelf, a puck light, and a linear light.

18. The bus system of claim 16, further comprising a second external accessory, wherein each of the external accessory and the second external accessory is selected from the group consisting of: shelf, puck light, and linear light.

19. The bus system of claim 15, wherein the first power circuit is configured to provide AC power and the second power circuit is configured to provide DC power.

20. The bus system of claim 15, wherein both the first power circuit and the second power circuit are configured to provide AC power.

* * * * *